United States Patent Office 3,131,074
Patented Apr. 28, 1964

3,131,074
SOIL STABILIZATION
Charles E. Thompson, Jr., Martinsburg, W. Va., assignor to Products Development Company, Jefferson County, W. Va., a corporation of West Virginia
No Drawing. Filed June 19, 1961, Ser. No. 117,774
20 Claims. (Cl. 106—63)

This invention relates to soil stabilization and more particularly to a method of making compact, water resistant masses of high strength from naturally occurring soils.

Prior to this invention, a number of materials have been employed in admixture with soil for the purpose of "stabilization" in the sense of increasing and/or maintaining the load-bearing strength of a soil without undue volume change under changing conditions of both moisture content and temperature. Such additive materials so used with some success include among others, Portland cement, lime, lime and flywash, various resins and phosphoric acid. However, all of the heretofore known systems of soil stabilization have certain disadvantages such as high cost, a lengthy cure period, inconvenience of application and use limited to only certain types of soil.

It is an object of this invention to provide a novel method of stabilizing soil that is economically useful for practically all soil types and soil-like materials.

Another object of the invention is to rapidly stabilize soil to an acceptable degree of moisture resistance and strength.

Still another object is to adequately stabilize soils containing a high percentage of very fine-grained materials such as silt and clay.

Yet another object is to stabilize soils in situ so that they may be used as foundation, sub-base or base sections of the roads, parking lots, driveways and the like.

Another object of the invention is to manufacture from soil, shaped articles including building bricks and panels with highly desirable properties.

Other objects and advantages of the invention will be apparent from the detailed description of the invention which follows.

The above and other objects are accomplished by the practice of this invention which, briefly, comprises stabilizing soil to produce a compact, water resistant, high strength mass by admixing with the soil prior to compacting, a stabilizing agent or additive comprising from about 0.1% to about 5.0% by weight, preferably about 0.5% to 2.0% by weight, of a water insoluble, alkali-soluble protein such as casein, or a water-solubilized scleroprotein such as glue or gelatin, or mixtures thereof, and from about 1% to about 20% by weight, preferably from 2% to 5% by weight, of an alkaline material selected from the group consisting of an alkaline earth metal hydroxide such as hydrated lime, an alkaline earth metal oxide such as calcium oxide, Portland cement or a mixture of any of these materials, all weight percentages being based on the dry weight of the soil which passes a standard No. 10 screen. (The soil particles which will not pass a No. 10 screen with thorough washing may be considered as aggregates.) The ratio by weight of the alkaline material to the protein should be at least 1:1, preferably at least 2:1. The moisture content of the admixture of all of the soil (including what does not pass a No. 10 screen) and the stabilizing additive, is adjusted to about optimum. The admixture is subsequently compacted. The stabilizing process should be carried out at a minimum temperature of about 40° F. Preferably, the soil additive admixture should have a temperature of at least 40° F. and the temperature of the ambient atmosphere should be at least 50° F. The resultant stabilized soil is characterized by a higher early strength and a much higher degree of water-resistance than it is possible to obtain employing equivalent and higher amounts of the alkaline material alone.

In the case of using Portland cement to stabilize coarse-grained sands or gravely soil, it is, of course, possible to obtain with the addition of sufficient cement, a water-resistant, high strength durable mass which is or very nearly the equivalent to ordinary concrete, but when a protein is used in addition to Portland cement as taught herein, much less Portland cement is necessary to obtain equivalent properties particularly water resistance. Moreover, soil stabilized with a combination of Portland cement and a protein will not crack over long periods of use whereas soil stabilized with Portland cement alone has a tendency to crack. With respect to lime or lime-flyash stabilization, which is most commonly used for fine-grained soils, i.e., containing large proportions of silt and/or clay, a similar reduction in the amount of lime or lime and flyash required is accomplished when protein is used in accordance with this invention. Moreover, and of even greater significance, is the high early strength achieved when protein is used with lime since, prior to this invention, soils stabilized with lime or lime-flyash have been characterized by very low early strength. The present invention accomplishes in a few hours or days what can be done with lime only over a period of several months. Furthermore, previously known soil stabilizing systems have never proven entirely satisfactory for soils containing substantial amounts of highly plastic and/or expansive clays, whereas applicant's stabilizing agent is entirely satisfactory for all such soils. Therefore, it is apparent that the present invention constitutes a basic improvement in the lime, lime-flyash or Portland cement stabilization of soils.

The stabilized soils or soil masses produced according to this invention have many highly practical uses. Some of these uses are described and illustrated in detail below including as bricks, blocks and building panels, as foundations, bases and sub-bases for roads and as other structures. Also, the stabilized soils are useful a dams and levees, as underground conduits such as storm sewers, as aqueducts, as pilings (both underwater and underground), and for many other purposes.

Proteins which may be used in the practice of this invention include the water-insoluble, alkali-soluble proteins as well as the water-solubilized scleroproteins. Examples of water-insoluble, alkali-soluble proteins include the glutelins such as glutenin and the prolamines (or prolamins) such as zein, gliadin, hordein and bynin among the simple proteins, and the phosphoproteins such as casein among the conjugated proteins. Gelatin and glue obtained by heating collagen in water, are the most common examples of water-solubilized scleroproteins. Proteins obtained from vegetables (i.e., vegetable proteins) such as gluten (a mixture of glutenin and gliadin) from wheat, soybean protein (glycinin—obtainable commercially in either beta or delta form) etc., may be used.

Although lime $(Ca(OH)_2)$ is the preferred alkaline material to be used in the practice of this invention, alkaline earth metal oxides or other alkaline earth metal hydroxides may be used such as barium hydroxide, calcium oxide or barium oxide. In general, any Portland cement may be used in this invention including types I, II, III, IV and V in accordance with A.S.T.M. C150–47. Type III, high early strength cement, is preferred. The alkaline earth metal oxides, alkaline earth metal hydroxides or Portland cement may each be used as the sole alkaline material in the stabilizing agent or they may be used in admixture with one another.

When the soil to be stabilized in accordance with this invention does not contain iron oxides, e.g., sandy soils, it is preferred that from about 0.5% to 3.0% by weight of ferric oxide based on the dry weight of the soil which passes a No. 10 screen, be present in the soil-additive admixture. Ferric oxide so used accelerates the stabilization of the soil and the stabilized soil mass has a higher water resistance than when ferric oxide is not present.

The optimum moisture content of the admixture of soil and additive materials described herein conveniently and preferably is determined by adding 2% to the optimum moisture content of the soil alone expressed as percent by weight of dry soil, e.g., if the optimum moisture content of the soil is 17.0% by weight of dry soil, then, for the purposes of this invention, the optimum moisture content of the admixture will be 19.0% by weight of the dry soil in the admixture. Further, it is preferred that the amount of moisture present in the admixture exceed optimum by about 5% of optimum, and this result is approximated by the 2% addition to optimum for the soil alone. The moisture content of the admixture may exceed optimum by up to about 10% of optimum. The optimum moisture content of a soil or soil-like substance is the amount of water added to the substance in dry form that permits compaction thereof to the smallest possible volume.

It is preferred but not essential to premix the constituent ingredients of the stabilizing additive. The stabilizing additive may be stored for long periods of time in the absence of undue moisture and then transported in dry form. The stabilizing additive is prepared by mixing together from about 2% to about 50% by weight of the protein and from about 50 to 98% by weight of the alkaline material, all weights being based on the total weight of the stabilizing additive. Other compounds may be optionally added to the stabilizing agent. For example, up to about 75% by weight of the alkaline material may be replaced by ferric oxide provided the ratio of alkaline material to protein is maintained above 1:1 by weight. Fillers, such as saw dust in an amount of up to 10% by weight of the additive or asbestos in an amount of up to 20% by weight of the additive may also be added either to the additive or the soil-additive admixture.

Flyash may be included in the stabilizing additive in amounts up to 75% by weight thereof. However, the ratio of alkaline material to protein must still be at least 1:1. Fly-ash also may be incorporated separately into the soil to be stabilized. Whether a constituent of the additive or added separately, amounts up to about 5% by weight based on the dry weight of the soil which passes a No. 10 screen, may be employed.

At the time of utilization of the prepared stabilizing agent, it is mixed together with soil or a combination of soils and water in an amount sufficient to obtain the desired pouring, molding, compacting or extrusion consistency. The amount of water present preferably is at about optimum for the mixture of soil and additive as set forth above. The amount of stabilizing additive to be used will depend largely upon the characteristics of the soil to be treated and may vary from about 0.5% to about 10% by weight based on the dry weight of the soil which passes a standard No. 10 screen. Satisfactory results are generally obtained by using from about 4 to 8% and preferably about 5% by weight of the stabilizing additive. The amount of additive used should be such to provide at least 0.1% by weight of protein based on the dry weight of the soil which passes a No. 10 screen as stated above.

In one embodiment of this invention, the stabilizing agent previously described may be used in the manufacture of bricks, blocks or panels of high quality which may in turn be used in the construction of houses or other buildings. In the past the cost of building materials and labor for the construction of housing for families in the lower and middle income brackets has forced builders to resort to inferior materials. Consequently, homes built under these conditions are frequently unattractive and require considerable maintainance. By the use of applicant's novel stabilizing agent, however, it is possible to manufacture bricks and the like utilizing the soil at or near the site of construction, using conventional brick or block-making machinery if desired. The soil is stabilized in accordance with the instant invention and the mixture is then formed into bricks, blocks or panels and air-dried. The resulting shaped masses are of natural beauty of great strength, highly moisture resistant and possess exceptionally low thermal conductivity. A house built of such bricks, blocks or panels requires no insulation, waterproofing or furring. Plaster or paint may be applied directly to the inner surface of the walls, if desired. However, in many cases, the natural beauty of the brick is left uncovered.

In the manufacture of bricks, blocks, or panels according to the practice of this invention, the dry stabilizing agent may be mixed with the soil prior to the addition of water. Although any soil may be used, best results are obtained when no more than 50% and preferably about 20 to 35% by weight of the soil used is clay or other fine-grained soil such as silt, and when at least 50% and preferably about 70% by weight of the soil is sand, at least 80% of which passes a No. 10 mesh screen.

It has also been found that the addition of about 0.5% to about 3% of ferric oxide based on the dry weight of the soil passing a No. 10 screen, to the stabilizing agent will result in increased strength and waterproofing of the final brick particularly when the soil itself is lacking in iron oxide content as when the soil contains a high percentage of sand. Moreover, it has been noted that the curing process of the brick is greatly expedited by the presence of ferric oxide—i.e., the ferric oxide tends to act as a catalyst, promoting the chemical reaction between the constituents of the stabilizing additive and the soil. It has further been found that when ferric oxide is incorporated in the stabilized soil mixture, the bricks become continuously stronger and more resistant to moisture over a period of years.

In making bricks, blocks or panels, the amount of agent which should be used may be determined by mixing a small amount of the agent with a sample of soil. Water should be added to the desired consistency and, upon drying the mixture, a determination of the resistance of the consolidated mixture to change in moisture content by a capillary water absorption test is made. This test may be carried out by molding the combined mixture under standard conditions into suitable shape and, after drying, standing it so that the base is continuously in contact with a water saturated porous surface in accordance with Uniform Building Code Standards and/or American Society for Testing Materials Standards. The water absorption is then measured to determine whether sufficient stabilizing agent has been added to achieve the required water resistance.

Bricks or blocks may be formed by extrusion of the admixture of soil, stabilizing agent and water or by a conventional molding method. If the latter method is used, the admixture should be of a consistency which will permit removal of the mold from the brick or block immediately after filling and levelling of the material in the mold. The bricks or blocks may also be formed by a tamping method, or a monolithic wall may be tamped between movable forms by reducing the moisture content of the admixture to be of a tamping consistency. In all such molding or shaping operations the moisture content of the admixture is at about optimum or slightly in excess of optimum in order to obtain the desired molding characteristics. The structures are then either oven dried at moderate temperature, e.g., at less than 200° F., or allowed to air dry.

It is preferable that the mixture of soil, stabilizing agent and water should be at a temperature of at least about 40° F. when the bricks are molded and the surrounding air temperature should preferably not be below about 50° F. during the curing process.

The numbered examples which follow are specific embodiments of the invention and set forth the best mode contemplated for carrying out the invention.

Examples 1–3, below, in which all parts and percentages given by weight, illustrate the production of molded bricks or blocks in accordance with the practice of this invention:

EXAMPLE 1

A mixture composed of 15 parts of casein, 20 parts of Portland cement and 20 parts of hydrated lime was admixed with 1000 parts by dry weight of unwashed Shenandoah River sand. To this mixture there were added 80 parts of water. After the composition was thoroughly mixed to compacting consistency, the material was fed into a Dunbrick machine and formed into bricks. These were removed from the machine, placed in racks and air-dried. No heat was applied. The resulting bricks were of extremely low thermal conductivity, high compressive strength and were highly water resistant.

EXAMPLE 2

A combination of fine-grained, plastic clay soil, 100% of which passes a No. 40 sieve, and sand, 100% of which passes a No. 10 sieve, in a proportion of 30 parts clay and 70 parts sand, was admixed thoroughly with 2% of casein, 1% of Portland cement, 2% of hydrated lime, 3% of ferric oxide, and 14% of water, all percentages being based on the total dry weight of the clay and sand, to attain a suitable compacting consistency. This combined mass was formed into 4" x 8" x 16" blocks by conventional molding methods. No special adjustment or control of the standard blockmaking machine was necessary. The resulting blocks were cured in dry air with no heat applied. The blocks were masonry units suitable for bearing wall construction and were attractive in both color and texture, having high compressive strength. A wall constructed of these blocks and waterproof mortar requires no further furring or waterproofing. The blocks in the wall became stronger and more resistant to moisture over a period of years without shrinkage. A block removed from the wall after several months withstood 5 hours of boiling in water without deleterious effects.

EXAMPLE 3

To a soil sample comprising a combination of 30% by dry weight of soil having a classification of A–4 (8) (AASHO Designation: M145–49, The Classification of Soils and Soil-Aggregate Mixtures for Highway Construction Purposes) and 70% by dry weight of sand 100% of which passed a No. 10 screen, there was added, based on the total dry weight of the combination soil sample, 2% of casein, 1% of Portland cement, and 2% of lime. Water was then added in a quantity sufficient to attain a molding consistency and the mixture was thoroughly stirred. Bricks were molded from this composition by conventional techniques. The molded bricks were air-dried at room temperature. The resultant bricks possessed a natural appearance, were of high compressive strength, were extremely resistant to moisture absorption and possessed unusual insulating qualities. Moreover, these bricks were remarkably resistant to shock from impact.

According to another embodiment of this invention, compact, water resistant masses may be prepared from soil stabilized by the process of this invention to form a suitable foundation, sub-base or base for highways, airport runways or other covered surfaces. It is well known that a structure is no more permanent than the foundation upon which it is constructed. Therefore, it is customary in the construction of roads and streets and other paved areas to transport stone and gravel and other base material to the site of the construction. As the percentage of fine grained clay and silt increases the more difficult it becomes to obtain satisfactory foundations for highways without placing of excessive thicknesses of base coarse material. In order to be suitable as a base, sub-base or foundation material, the mass must be capable of repelling surface water such as from rain and melting snow as well as water from capillary rise and lateral flow and must not be affected by alternate freezing and thawing and the high temperatures of summers. Moreover, these subsurface materials must develop high compressive strengths within a few days which will increase with age. By the practice of applicant's invention, it is possible to form a compact mass meeting these requirements from the soil available at the site of construction by stabilizing the soil by the herein defined process. The soil is merely removed from its natural site such as by a scarifying method, admixed with the stabilizing agent and water and the resulting mixture returned to the ground to a suitable depth, advantageously in layers or lifts of varying thickness, such as about three to six inches, followed by compaction of the admixture as by rolling. It is preferred that the soil to be stabilized, other than stone and gravel, be pulverized until a minimum of 80% will pass a ⅜ inch square mesh sieve and that the largest individual particles in the material to be stabilized be no greater in diameter than 35% of the depth of the finished layer. The amount of water present in the admixture should be adjusted if necessary to about optimum or slightly in excess of optimum. Preferably, as stated above, the optimum moisture content of the admixture is determined by adding 2% to the optimum moisture content of the dry soil to be stabilized expressed as percent by dry weight of the soil. The extent of compaction should be sufficient to provide approximately 95% maximum density as determined by A.A.S.H.O. T99–57. The base so produced develops a high compressive strength within a few days which increases with age. The base will not crack or lose strength on curing or on loss of moisture below optimum, it is impervious to moisture damage, and the volume does not change more than 1%. If the moisture content of the stabilized soil falls below optimum, such as is likely to occur in arid regions, it will at least retain the same high strength as it previously possessed. Subsequently, when subjected to contact with moisture, it will take up water up to optimum moisture content and will still have the same high strength as it had before drying out. This described treatment is effective for all soil classifications, from A–1a through A–7–6 (AASHO Designation: M145–49). This makes possible the use of available material heretofore unacceptable for base construction.

After the foundation, base or sub-base has been prepared, it may be covered with concrete, asphalt, or other surfacing composition by conventional methods.

If the soil to be stabilized is fine-grained and highly plastic, e.g., contains more than about 80% clay which will pass a No. 200 screen, it is beneficial to pretreat the soil at least 48 hours in advance of carrying out the stabilization process of this invention as described hereinabove. The pre-treatment may be carried out in one of several ways: (1) up to about 75% by weight of the alkaline material in the additive, preferably hydrated lime, is premixed with the soil, (2) up to about ½ by weight of the entire additive material is premixed with the soil or (3) the soil is premixed with from about 2% to 8% by dry weight of the soil of hydrated lime in addition to what is used in the additive. No compaction is necessary with any of these pretreatments. The third alternative pretreatment with additional hydrated lime is preferred where the soil is substantially all clay passing a No. 200 screen and the clay is of the expansive type which is usually indicated by a plasticity index (A.A.S.H.O. T91–54) of about 35 or higher.

It is also possible to treat soil in situ as sub-surface material. In this embodiment from about 3 to 6 inches of the in place material which has been pulverized as with a disk hammer, cultivator pulvi-mixer or like equipment, is treated with an application of preferably about 5% of stabilizing agent by dry weight of that portion of the soil which passes a No. 10 screen, and water is added if necessary to achieve about optimum moisture content. Then, the mass is compacted as with a roller. An application of from .25 to .5 gallon of bitumen per square yard and a light application of fine stone chips or sand provides a completely satisfactory wearing surface for light traffic.

The foregoing described processes may also be used to provide surfaces for light trafficked roads, walkways, livestock feeding lots, etc., without covering it with any other surfacing material. The following example illustrates the provision of such a surface:

EXAMPLE 4

A clay soil from Jefferson County, West Virginia, was used in the construction of an entranceway at the delivery entrance of a business establishment. A section of this soil was removed from its natural site, admixed with a cementitious stabilizing agent consisting of 1% by dry weight of casein, 4% by dry weight of calcium hydroxide, and sufficient water to make the mixture of a pouring consistency. The mixture was poured into place about 3 inches in thickness. It was not compacted to remove excess of water and was not protected from weather.

After six months' exposure to weather and heavy usage during which time an unusual amount of rain had fallen the treated section remained hard and compacted and had the same general appearance as when the test began, while the surrounding area of untreated soil had softened to mud, which formed deep ruts under traffic and became too soft for traffic when wet.

EXAMPLES 5 TO 19

The examples below illustrate the stabilization of a large variety of different soils by the process of this invention. Table I lists the classification (A.A.S.H.O. Designation: M145–49, The Classification of Soils and Soil-Aggregate Mixtures for Highway Construction Purposes which is a part of the "Report of Committee on Classification of Materials for Subgrades and Granular Type Roads," published in the Proceedings of the 25th Annual Meeting, Highway Research Board, 1945) of the soil stabilized in each example, the amount of stabilizing additive used (based on the weight of soil passing a number 10 screen) and the percent by weight, based on the total weight of the stabilizing additive, of each of the constituent ingredients in the additive. These examples represent a basic recommended guide for the stabilization of soils of varying characteristics, and a soil so stabilized is especially useful as a base, sub-base, or foundation for highways carrying heavy traffic.

*Table I*

| Example | Soil Classification | Percent Additive Used | Percent Casein in Additive | Percent Iron Oxide in Additive | Percent Portland Cement in Additive | Percent Hydrated Lime in Additive |
|---|---|---|---|---|---|---|
| 5 | A-1-a | 5 | 11 | 21 | 68 | 0 |
| 6 | A-1-b | 5 | 12 | 20 | 68 | 0 |
| 7 | A-3 | 5 | 12 | 20 | 68 | 0 |
| 8 | A-2-4 | 5 | 10 | 14 | 50 | 26 |
| 9 | A-2-5 | 5 | 11 | 11 | 39 | 39 |
| 10 | A-2-6 | 5 | 12 | 9 | 34 | 45 |
| 11 | A-2-7 | 5 | 12 | 6 | 31 | 51 |
| 12 | A-4 | 5 | 13 | 0 | 29 | 58 |
| 13 | A-5 | 5 | 13 | 0 | 27 | 60 |
| 14 | A-6 | 5 | 13 | 0 | 26 | 61 |
| 15 | A-7-5 | 5 | 12 | 0 | 25 | 63 |
| 16 | A-7-6 | 5 | 11 | 0 | 23 | 66 |
| | | | | | Quicklime (CaO) Substituted for Portland Cement | |
| 17 | A-6 | 5 | 13 | 0 | 26 | 61 |
| 18 | A-7-5 | 5 | 12 | 0 | 25 | 63 |
| 19 | A-7-6 | 5 | 11 | 0 | 23 | 66 |

Sufficient water was added to the composition of each example to provide 2% by weight above the optimum moisture content of the soil which was stabilized. Surfaces were provided by forming a layer of the resulting mixture on the ground and compacting the layer to provide at least 95% maximum density. In Examples 5 to 11 the stabilized masses were used as bases for concrete pavements—i.e., the stablized sub-surfaces were each covered with a layer of concrete. In EXAMPLES 12 to 19, the stabilized surfaces were not covered with any other surfacing material. The surfaces and sub-surfaces provided by all of these examples were impervious to moisture damage, developed high compressive strength within a few hours which increased with age and were not adversely affected by alternate freezing and thawing or by very high temperatures.

EXAMPLES 20 TO 24

In each of these examples, the procedure of Example 16 was repeated with the sole exception that the casein was replaced by an equal amount (i.e., 11% by weight, based on the total weight of the stabilizing additive) of the following proteins:

| Example | Protein |
|---|---|
| 20 | beta—soya protein. |
| 21 | delta—soya protein. |
| 22 | zein. |
| 23 | wheat protein (gluten). |
| 24 | gelatin. |

Equivalent results were obtained in the resulting surfaces as were obtained in Examples 5 to 19.

The following Examples 25 to 27, in which all parts and percentages given are by weight, illustrate the stabilization of soils which may be used in road foundation bases or sub-bases and also show the effectiveness of such stabilized soils as determined by the described testing procedures.

EXAMPLE 25

A mixture of 3⅓ parts of casein, 3⅓ parts of Portland cement, and 13⅓ parts of high calcium hydrated lime were admixed with 400 parts of Keyport clay. To this dry mixture there were then added 84 parts of water and the composition was thoroughly stirred. This composition of soil and stabilizing additive was then compacted into a 2" x 4" cylinder in four 1" lifts by A.A.S.H.O. T99–57, Method A. Each lift was compacted by 12 blows of the hammer. Upon removal from the mold, the cylinder was placed in a 100% relative humidity cabinet, and held there for 5 days to prevent drying. The cylinder was then removed from the cabinet and submerged under water for 2 days. Immediately upon removal from the tank the cylinder was tested for unconfined compressive strength. The strength attained was 109 p.s.i., the plasticity index was substantially reduced and moisture absorption from time of compaction was 0.5%. A similar cylinder of untreated soil was prepared and tested as above. The cylinder disintegrated upon submersion in water.

EXAMPLE 26

A soil sample was prepared by thoroughly admixing 3⅓ parts of casein, 3⅓ parts of Portland cement, and 13⅓ parts of high calcium hydrated lime with 400 parts of Cecil clay. To this there were added 84 parts of water and the mixture was thoroughly stirred to form a slurry. The composition was then compacted into 2" x 4" cylinders in 4 1" lifts by A.A.S.H.O. T99–57, Method A. Each lift was compacted by 12 blows of the hammer. Upon removal from the mold, the cylinder was placed in a 100% relative humidity cabinet and held there for 5 days to prevent drying. The cylinder was then removed from the cabinet and submerged under water for 2 days. Immediately upon removal from the tank, the cylinder was tested for unconfined compressive strength. The strength attained was 106 p.s.i., the plasticity index was substantially reduced and moisture absorption from time of compaction was 0.5%. A similar cylinder of untreated soil was prepared and tested as above. The cylinder disintegrated upon submersion in water.

EXAMPLE 27

To 100 parts of Keyport clay loam, 93% of which passes a No. 40 screen and 62% of which passes a No. 200 screen and having an A.A.S.H.O. Classification of A-7-6(12), was added 1 part of delta-soybean protein, 1 part of Portland cement and 4 parts of lime. Sufficient water was added to attain the optimum moisture content. Cylinders were then compacted with Vicksburg impact hammer equipment to maximum density at optimum moisture as determined by A.A.S.H.O. T99-57, Method A. The cylinders were 2 inches in diameter and 4 inches long. Table II sets forth the characteristics of the stabilized molded cylinders. By way of contrast, the characteristics of cylinders molded from the unstabilized soil used in this example are also given.

*Table II*

|  | Cylinders of Unstabilized Soil | Cylinders of Stabilized Soil |
|---|---|---|
| Plasticity Constants: |  |  |
| Liquid limit | 46 | 44 (age one day. 43 (age eight days). |
| Plasticity index | 24 | 16 (age one day). 15 (age eight days). |
| Volume change at 140 hrs | 9.2% | 0.3%. |
| Compaction: |  |  |
| Max. Dry Density, lb./cu. ft | 111 | 106. |
| Optimum moisture | 17% | 19%. |
| Moisture Absorption (after 5 days' moist curing and 2 days' immersion in water). | (disintegrated.) | 0.5%. |
| Unconfined compressive strength: p.s.i. (after 5 days' moist curing and 2 days' immersion in water). | 0 | 110. |

EXAMPLE 28

This example illustrates a pretreatment of the soil. To 100 parts by dry weight of a soil, 99.79% of which passes a No. 40 screen and 98.50% of which passes a No. 200 screen, having an A.A.S.H.O. Classification of A-7-6(20), a plastic limit of about 29 and a plasticity index of 35, was added 3 parts by weight of hydrated lime. The mixture of soil and lime was allowed to stand for 48 hours, and there was then added 1 part by weight of casein, 1 part by weight of Portland cement, and 4 parts by weight of hydrated lime. Sufficient water was added to attain the optimum moisture content. Cylinders were then compacted with Vicksburg impact hammer equipment (A.A.S.H.O. T99-57, Method A) by 31 blows of the hammer. Upon removal from the mold, the cylinders were cured for 5 days in a 100% relative humidity cabinet. The cylinders were then removed from the cabinet and immersed in water for 2 days. Immediately upon removal from the tank, the cylinders were tested for unconfined compressive strength. The strength attained was 215 p.s.i. After the pretreatment with 3% by weight of hydrated lime, the plastic limit had increased to 54 and the plasticity index was reduced to 11.

The process of this invention may be used in other applications as well as those previously described. For example, mortar for laying bricks or blocks may be waterproofed by the addition of about 3% to about 7% by weight of the cement and lime in the mortar mixture, of a protein as set forth above, e.g. casein. Such a mortar may comprise 1 part by volume of Portland cement, 1¼ to 3 parts by volume of hydrated lime, 2 to 4 parts by volume of sand and about 5% casein by weight of the cement and lime. Such a composition will require less water in mixing and will remain workable longer in hot weather than a mortar from which the protein has been omitted. Moreover, mortar treated in accordance with this invention has unusually high adhesive qualities for cementing highly polished surfaces.

Waterproof or moisture-resistant concrete and cinder blocks may also be prepared in accordance with this invention by adding about 2.5% to 10% of protein, and preferably about 3 to about 7%, by weight of the Portland cement to a standard mixture used in the manufacture of concrete and cinder blocks. Less water will be required in mixing to the proper consistency since the addition of the protein renders the mixture more workable. The blocks are preferably air dried at above about 50° F. The following examples in which all parts given are by weight, illustrate the preparation of concrete blocks and cinder blocks in accordance with this invention:

EXAMPLE 29

A mixture was prepared comprising 750 parts of gravel, 750 parts of sand, 188 parts of Portland cement, 95 parts of flyash and about 9½ parts casein. Sufficient water was added to make the mixture moldable. The mixture was cast into a block which was then allowed to air dry at a temperature of about 55° F. The resultant concrete block was highly water resistant.

EXAMPLE 30

The procedure of Example 29 was repeated except that the gravel was replaced by an equal amount of cinders. The cinder block thus obtained was highly water resistant.

This application is a continuation-in-part of my copending application Serial No. 761,920, filed September 19, 1958, which, in turn, is a continuation-in-part of my abandoned application Serial No. 673,124, filed July 22, 1957, both now abandoned.

I claim:

1. A method for effecting the stabilization of soil, which comprises admixing with soil from about 0.5% to about 5.0% by dry weight of the soil of a protein selected from the group consisting of glutelins, prolamines, casein, gelatin, glue, gluten and soybean protein, and mixtures thereof; and from about 1% to about 20% by dry weight of the soil of an alkaline material selected from the group consisting of an alkaline earth metal hydroride, an alkaline earth metal oxide, Portland cement and mixtures thereof, the ratio by weight of the alkaline material to the protein being at least 1:1, the moisture content of said admixture being at from about optimum to about 10% in excess of optimum; and subsequently compacting the mixture.

2. The method of claim 1 wherein amounts of about 0.5 to 2.0% protein and about 2.0 to 5.0% alkaline material by dry weight of the soil passing a No. 10 screen are used.

3. A method for effecting the stabilization of soil which comprises admixing with soil from about 0.5 to 2.0% by dry weight of the soil passing a No. 10 screen of casein, and from about 2.0 to 5.0% by dry weight of the soil passing a No. 10 screen of a mixture of hydrated lime and Portland cement, adjusting the moisture content of said admixture to from about optimum to about 10% in excess of optimum, and subsequently compacting the mixture.

4. A method for effecting the stabilization of soil which comprises admixing with soil from about 0.5 to 2.0% by dry weight of the soil passing a No. 10 screen of casein, from about 2.0 to 5.0% by dry weight of the soil passing a No. 10 screen of Portland cement, adjusting the moisture content of said admixture to from about optimum to about 10% in excess of optimum and subsequently compacting the mixture.

5. A method for effecting the stabilization of soil which comprises admixing with soil from about 0.5 to 2.0% by dry weight of the soil passing a No. 10 screen of casein, from about 2.0 to 5.0% by dry weight of the soil passing a No. 10 screen of hydrated lime, adjusting the moisture content of said admixture to from about optimum to about 10% in excess of optimum and subsequently compacting the mixture.

6. A method for the manufacture of bricks and blocks having low thermal conductivity and high moisture resistance and strength which comprises the steps of admixing with a soil composition comprising not more than 50% by weight of clay and at least 50% by weight of sand, from about 0.5 to 2.0% by dry weight of the soil of a protein selected from the group consisting of glutelins, prolamines, casein, gelatin, glue, gluten and soybean protein and mixtures thereof, from about 2.0 to 5.0% by dry weight of the soil of an alkaline material selected from the group consisting of an alkaline earth metal hydroxide, an alkaline earth metal oxide, Portland cement and mixtures thereof, and from about 0.5 to 3% by dry weight of the soil of ferric oxide; adjusting the moisture content of said admixture to from about optimum to about 10% in excess of optimum; subsequently molding the mixture into a brick; and removing axcess moisture from the brick.

7. The method of claim 6 wherein the protein is casein and the alkaline material is a mixture of Portland cement and hydrated lime.

8. The method of claim 7 wherein the admixture is at a temperature of at least 40° F. prior to molding.

9. The method of claim 8 wherein the moisture is removed from the molded brick by subjecting said brick to an ambient temperature of at least 50° F.

10. A method for preparing an area of stabilized soil having high compressive strength, low volume change and high moisture resistance comprising the steps of removing soil from its natural site, admixing said soil with from 0.5 to 2.0% by dry weight of the soil of a protein selected from the group consisting of glutelins, prolamines, casein, gelatin, glue, gluten and soybean protein, and mixtures thereof, and from about 2.0 to 5.0% by dry weight of the soil of an alkaline material selected from the group consisting of an alkaline earth metal hydroxide, an alkaline earth metal oxide, Portland cement and mixtures thereof, adjusting the moisture content of said admixture to from about optimum to about 10% in excess of optimum, forming a layer of the resulting admixture on the ground, and compacting said layer.

11. The method of claim 10 wherein said protein is casein and said alkaline material is a mixture of Portland cement and hydrated lime.

12. The method of claim 11 wherein the soil is first pulverized until a minimum of 80% will pass a ⅜ inch square mesh sieve.

13. The method of claim 11 wherein the stabilized layer of soil is compacted to provide at least 95% maximum density.

14. The method of claim 10 wherein the area of stabilized soil is subsequently covered with another surfacing composition.

15. A method for preparing a surfaced area having high compressive strength, low volume change and high moisture resistance comprising the steps of treating soil in situ to a depth of from 3 to 6 inches with from about 0.5 to 2.0% by dry weight of the soil of a protein selected from the group consisting of glutelins, prolamines, casein, gelatin, glue, gluten and soybean protein and mixtures thereof, and from about 2.0 to 5.0% by dry weight of the soil of an alkaline material selected from the group consisting of an alkaline earth metal hydroxide, an alkaline earth metal oxide, Portland cement and mixtures thereof, adjusting the moisture content of the treated soil to from about optimum to about 10% in excess of optimum and subsequently compacting the stabilized soil.

16. The method of claim 15 wherein said protein is casein and said alkaline material is a mixture of lime and Portland cement.

17. The method of claim 15 wherein the compacted stabilized soil is subsequently covered with bitumen.

18. A method for preparing a surfaced area having high compressive strength, low volume change and high moisture resistance comprising the steps of mixing a highly plastic and expansive soil with about 2% to about 8% by dry weight of the soil of hydrated lime, at least 48 hours later admixing said lime-treated soil with from 0.5 to 2.0% by dry weight of the soil of a protein selected from the group consisting of glutelins, prolamines, casein, gelatin, glue, gluten and soybean protein, and mixtures thereof, and from about 2.0 to 5.0% by dry weight of the soil of an alkaline material selected from the group consisting of an alkaline earth metal hydroxide, an alkaline earth metal oxide, Portland cement and mixtures thereof, adjusting the moisture content of said admixture to from about optimum to about 10% in excess of optimum, and compacting said admixture.

19. The method of claim 18 wherein said protein is casein and said alkaline material is a mixture of Portland cement and lime.

20. The method of claim 1 wherein said protein is soybean protein.

References Cited in the file of this patent

UNITED STATES PATENTS

| | | |
|---|---|---|
| 2,158,025 | Hulst et al. | May 9, 1939 |
| 2,187,668 | Smith | Jan. 16, 1940 |

FOREIGN PATENTS

| | | |
|---|---|---|
| 698,792 | Great Britain | Oct. 21, 1953 |